(12) United States Patent
Kaiser et al.

(10) Patent No.: US 9,250,078 B2
(45) Date of Patent: Feb. 2, 2016

(54) METHOD FOR DETERMINING THE POSITION OF MOVING OBJECTS

(75) Inventors: Susanna Kaiser, Gilching (DE); Mohammed Khider, Gilching (DE); Patrick Robertson, Ammerland (DE)

(73) Assignee: Deutsches Zentrum Fuer Luft-Und Raumfarhrt E.V., Cologne (DE)

( * ) Notice: Subject to any disclaimer, the term of this patent is extended or adjusted under 35 U.S.C. 154(b) by 50 days.

(21) Appl. No.: 14/119,347

(22) PCT Filed: May 8, 2012

(86) PCT No.: PCT/EP2012/058456
§ 371 (c)(1),
(2), (4) Date: Nov. 21, 2013

(87) PCT Pub. No.: WO2012/163632
PCT Pub. Date: Dec. 6, 2012

(65) Prior Publication Data
US 2014/0100776 A1    Apr. 10, 2014

(30) Foreign Application Priority Data

May 31, 2011    (DE) .......................... 10 2011 111 342

(51) Int. Cl.
*G01C 21/00* (2006.01)
*G01C 21/16* (2006.01)
*G01C 21/20* (2006.01)

(52) U.S. Cl.
CPC .............. *G01C 21/00* (2013.01); *G01C 21/005* (2013.01); *G01C 21/16* (2013.01); *G01C 21/206* (2013.01)

(58) Field of Classification Search
CPC .... G01C 21/00; G01C 21/206; Y10S 901/01; G05D 1/0274; G01S 13/723; G01S 13/726; G01S 13/87; G01S 13/931; G06K 9/4604; G06K 9/00389; G06K 9/6215

USPC ........... 701/518, 523, 480; 382/153; 342/450
See application file for complete search history.

(56) References Cited

U.S. PATENT DOCUMENTS

| | | | |
|---|---|---|---|
| 7,912,633 B1* | 3/2011 | Dietsch et al. | ................ 701/450 |
| 2007/0001904 A1* | 1/2007 | Mendelson | ................... 342/450 |
| 2007/0192910 A1* | 8/2007 | Vu et al. | .......................... 901/17 |
| 2011/0066303 A1* | 3/2011 | Hara | ................................ 701/1 |

(Continued)

OTHER PUBLICATIONS

Kaiser et al.; "A Human Motion Model Based on Maps for Navigation Systems"; Eurasip Journal on Wireless Communications and Networking; Aug. 15, 2011; pp. 1-14.

(Continued)

*Primary Examiner* — Mussa A Shaawat
*Assistant Examiner* — Shardul Patel
(74) *Attorney, Agent, or Firm* — Ohlandt, Greeley, Ruggiero & Perle, LLP

(57) ABSTRACT

Method for determining the position of moving objects, wherein the object has a sensor or an apparatus for determining odometry data, having the steps of: transmitting the odometry data to a calculation device, estimating the location and position of the object with the aid of the calculation device, creating a diffusion matrix on the basis of the estimated location and position taking into account environmental data, determining a contour line on the basis of the diffusion matrix, determining the distances between the position and the contour line for different orientations, in particular each orientation, and calculating a probability density function on the basis of the distances determined.

13 Claims, 1 Drawing Sheet

(56) References Cited

U.S. PATENT DOCUMENTS

| | | | | |
|---|---|---|---|---|
| 2011/0106339 | A1* | 5/2011 | Phillips et al. | 701/2 |
| 2011/0123135 | A1* | 5/2011 | Hsieh et al. | 382/285 |
| 2011/0178708 | A1* | 7/2011 | Zhang et al. | 701/221 |
| 2011/0264421 | A1* | 10/2011 | Jing et al. | 703/2 |
| 2011/0288684 | A1* | 11/2011 | Farlow et al. | 700/264 |
| 2012/0182392 | A1* | 7/2012 | Kearns et al. | 348/46 |
| 2012/0195491 | A1* | 8/2012 | Zhang et al. | 382/153 |
| 2012/0232795 | A1* | 9/2012 | Robertson et al. | 701/532 |
| 2012/0303255 | A1* | 11/2012 | Wong et al. | 701/300 |

OTHER PUBLICATIONS

Kammann et al.; "A New Mobility Model Based on Maps; Vehicular Technology Conference"; vol. 5-6; 2003; pp. 1-6.

Kaiser et al.; "Maps-Based Angular PDF for Navigation Systems in Indoor and Outdoor Environments"; Indoor Positioning and Indoor Navigation; Sep. 21, 2001; pp. 1-7.

Khider et al.; "A Three Dimensional Movement Model for Pedestrian Navagation"; Institute of Communication and Navigation; pp. 1-11.

Seong-hoon et al.; "A Kalman/Particle Filter-Based Position and Orientation Estimation Method Using a Position Sensor/Inertial Measurement Unit Hybrid System"; Transactions on Industrial Electronics; vol. 57; May 5, 2010; pp. 1-12.

Kemppi et al.; "Hybrid Positioning System Combining Angle-Based Localization, Pedestrian Dead Reckoning and Map Filtering"; International Conference on Indoor Positioning and Indoor Navigation; Sep. 15-17, 2010; pp. 1-7.

Khider et al ; "Maps and Floor Plans Enhanced 3D Movement Model for Pedestrian Navigation"; Institute of Communication and Navigation; pp. 1-13.

Krach et al.; "Integration of Foot-Mounted Inertial Sensors Into a Bayesian Location Estimation Framework"; Institute of Communication and Navigation; pp. 1-7.

International Search Report dated Aug. 16, 2012 for PCT application No. PCT/EP2012/058456.

\* cited by examiner

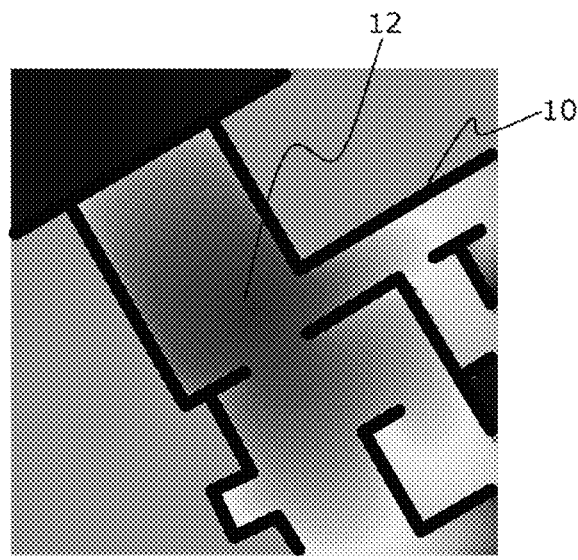
Fig.1
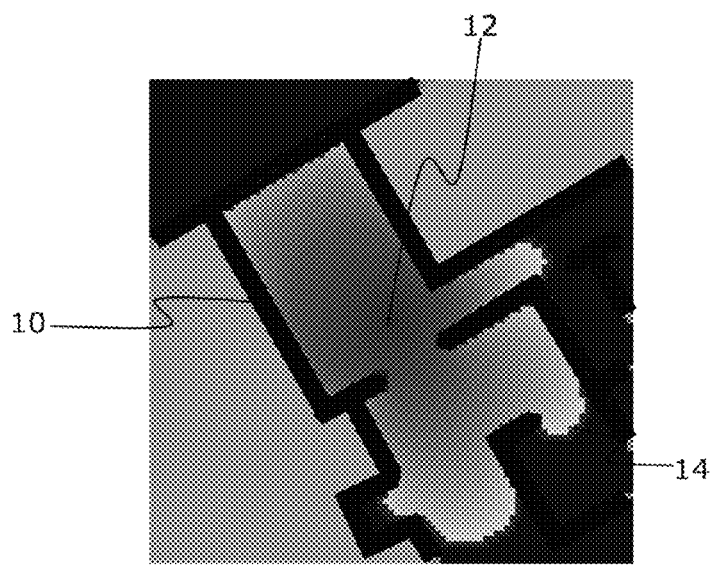
Fig.2
Fig.3
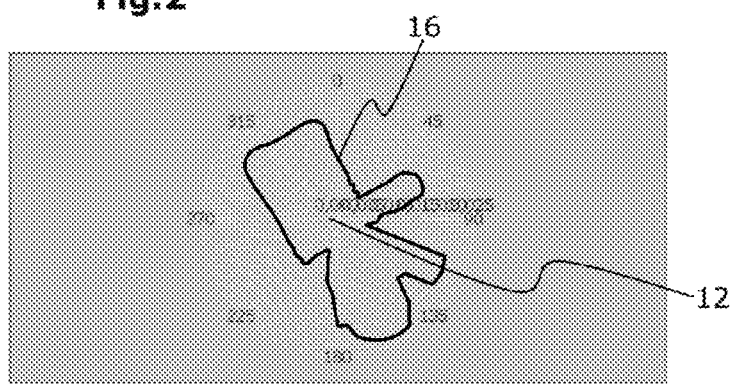

METHOD FOR DETERMINING THE POSITION OF MOVING OBJECTS

BACKGROUND

1. Field of the Disclosure

The disclosure refers to a method for determining the position of moving objects such as persons or robots, for example. The method of the present disclosure is particularly suited for implementation in buildings or in regions or areas blocked to satellite navigation.

2. Discussion of the Background Art

The localization of objects, such as persons or goods, is often performed using satellite navigation, e.g. by GPS. Outside of buildings, this yields an acceptable level of accuracy even with pedestrians having modern devices. Inside of buildings or when an object is in a blind area of the satellite, such as in narrow street canyons, strong interferences often occur that are due to the blocking of the direct signal path or due to multipath errors.

In order to improve the localization of objects also in such areas, it is known to use further radio systems such as WLAN mobile phone networks, UWB (Ultra-Wide Band) networks and the like. Substantial drawbacks of a combination with other radio systems are a possibly limited availability, the necessary infrastructure and a possibly restricted access. A prerequisite for an implementation of these methods is the existence of radio infrastructures. Further, the respective areas have to be mapped and measured. This represents a substantial economic effort.

Another possibility for improving the localization of objects in buildings and the like is the use of sensors connected with the moving object and transmitting information about the movement of the object to a corresponding computing means. The corresponding sensors may be passive or active optical sensors and sensor systems. For example, these may also be inertial sensors, odometry systems in the case of robots, or barometric altimeters. The advantage is that infrastructure elements, such as described above (WLAN, UWB etc.) can be dispensed with completely or partly.

Another possibility for improving the accuracy of localization is the combination with environmental data such as building maps, for example. B. Krach, P. Robertson, "Integration of Foot-Mounted Inertial Sensors into a Bayesian Location Estimation Framework", Proc. 5th Workshop on Positioning, Navigation and Communication 2008 (WPNC 2008, Hannover, Germany, March 2008, describes that previous knowledge about building plans and the use of an inertial sensor provided in the shoe of a person are suited for an unambiguous localization of a person in a building. By means of the inertial sensor (IMU) used, all three spatial axes can be measured. In this method, an IMU sensor is integrated in a shoe of a person moving in a building. The sensor transmits acceleration and rotation rate data to a computing means. The computing means comprises a filter means which is an Extended Kalman Filter (EKF). The filter means is used to estimate the relative change of the orientation and position of the shoe and thus of the person (so-called odometry). Orientation is understood to be the orientation in space, i.e. an indication including three angles. Position refers to the location in space (typically in a local or global 3D coordinate system). In particular when a person is in a building for a longer period of time, the effect of sensor errors (drift) on the estimation of position or orientation may possibly grow infinitely. Therefore, it is known to perform a so-called "Zero Velocity Update" (ZUPT) Here, in a rest phase of the sensor or the person, in which the shoe is on the ground, the EKF is set to zero velocity. The rest phase of the sensor or the person can be determined in a relatively reliable and simple manner, since the steps of a human show a characteristic pattern so that a kind of signature of the acceleration and rotation rates can be determined with respect to a person.

It is an essential drawback of this method, however, that due to the drift, ever increasing errors in the orientation about the vertical axis occur which can be observed only in a limited manner by means of ZUPT. As a consequence, primarily the estimation of the orientation of the person (i.e. the orientation about the vertical axis) becomes increasingly inaccurate. It is another drawback of this method that also the estimated covered distance becomes inaccurate, though to a lesser degree. Further, if this system is used exclusively, there is a drawback that only the relative positioning, especially with respect to a starting point, can be determined.

An improvement of the method using EKF and ZUPT can be achieved by linking it to a further filter means that considers environmental data such as building plans. Here, the estimation made by means of the EKF includes assumed statistical deviations relative to the step direction and the stride. The hypotheses calculated from this thus take into account all possible deviations from the actual sequence of steps of a person. By this link to environmental data, which e.g. include the walls in a building, a probability is taken into account using a particle filter algorithm. Thus, hypotheses made in the particle filter which pass through walls are either eliminated completely or are accorded a very low probability. Hypotheses that do not pass through walls are either accorded a probability value 1 or may be weighted according to a simple model of movement.

However, taking environmental data into account in this manner may lead to erroneous judgments in the determination of a position. One may for instance consider a case in which the starting position is not known exactly, and can be located inside or outside a building, for example. Based on this starting point, hypotheses that lie outside the building will be taken into account with high probability. As a consequence, even if the person is actually inside the building, hypotheses lying inside the building will increasingly be accorded a very low probability or will possibly be deleted entirely, due to the fact that they meet walls. This is not the case for hypotheses lying outside the building, since they are not accorded a low probability for meeting walls.

It is an object to provide a method for determining the position of moving objects that allows for better localization in particular in buildings and in areas blocked to satellites.

SUMMARY

The moving object may in particular be a person, a robot, a vehicle and the like, but it may also refer to goods being moved. The object has an associated sensor for acquiring acceleration data and rotation data. In particular, this may be an IMU. The sensor transmits acceleration data and rotation data to a computing means comprising a filter means. If the sensor is associated to a person, for instance, it is favorable but not necessary to arrange the sensor in a shoe in order to detect the rest phase of the sensor. For robots, odometry can be performed directly from the control signals of the drive motors (without IMU) or by the use of rotary encoders (e.g. optically/magnetically) at the wheels. However, it should be considered in this case that the drift of the estimation must be reduced by other measures. In the next method step, the orientation and the position of the object are estimated using a filter means which in particular is an EKF (if the sensor is an IMU; with robots, the odometry calculation is performed as described above). Here, the consideration of environmental data is performed in the next superordinate step, preferably with the use of a particle filter. The use of such models of movement in combination with a particle filter is described, for example, in M. Khider, S. Kaiser, P. Robertson and M. Angermann, "Maps and Floor Plans Enhanced 3D Movement Model for Pedestrian Navigation", Proceedings of the ION GNSS 2009, Georgia, USA, September 2009 and in J. Kammann, M. Angermann and B. Lami, "A new mobility model based on maps", in VTC 2003. Here, preferably, a movement model is used, among others, which through the determination of a diffusion matrix determines possible paths and thus orientations with respect to different target points. The diffusion matrix is created with consideration to environmental data. In this case, the environmental data include, in particular, building plans, but may also include plans of an area. In building plans, walls, stairs and other obstacles such as furniture can be taken into account. With area plans, it is possible, depending on the type of terrain, to consider different probabilities with which a person moves in a respective area section. In this case, different probabilities for ways, lawns, beds, woods, fences etc. can be taken into account.

The difference to a particularly preferred embodiment of the method of the disclosure is that a path from one waypoint (estimated distance) to a previously defined target (source of diffusion) is calculated by means of diffusion. An essential drawback of the use of target points is that no suitable probability density function for possible orientations can be established therefrom, since the same depends on the selection of the target points and the observation range. In contrast thereto, the disclosure preferably uses the estimated orientation and position of each particle (=hypothesis) of the particle filter as the starting point (source) of the diffusion and calculates a probability density function from the diffusion. The setting of targets and the calculation of paths are omitted. The observation range—which is a section of the area map—can be reduced, since no far away targets have to be considered.

In the next step of the method of the disclosure, a contour line is determined based on the diffusion matrix created. Using the diffusion matrix it is possible to determine different contours. In particular, these are lines of the same value (similar values upon discretization) of gas concentration of the diffusion algorithm. The values of the diffusion matrix preferably lie in a value range from 0 to 1. If, in order to determine the contour line, a relatively high value is chosen as the threshold, for example, a relatively small observation range is considered. The observation range is that area map section by which the diffusion is calculated. Likewise, a relatively small threshold value can be selected so that the observation range becomes correspondingly larger. Thus, it is also possible to vary the contour line and the resulting probability density function.

Based on the defined contour line, distances between the position of the particle and the contour line are then determined for different orientations, in particular all orientations (i.e, positions around the vertical axis). The distances are thus determined for different angles, where "all orientations" means that a distance between the position and the contour line is respectively determined at angular increments of 5°, for example.

According to the disclosure a probability density function is calculated based on the distances determined. As a result of this, the possible directions of movement of the object are accorded higher values of probability than angles or angular ranges that lead to close obstacles such as walls, for example. These have a correspondingly lower probability value. This corresponds to the behavior of a moving object, in particular a moving person.

In particular due to the present calculation of a probability density function which is performed especially in dependence on distances between the position and the contour line, it is possible to significantly improve the determination of positions of objects also in closed rooms or in areas where no direct line-of-sight contact with a satellite is possible.

According to the disclosure a preferred embodiment of the above described method is performed continuously. In so far, it is preferred that the probability density functions calculated after a first iteration loop in dependence on the position of the object are stored in a database and thus do not have to be calculated again.

It is particularly preferred to combine the method of the disclosure with other methods for determining position data via additional systems. This may be a GPS-assisted system or the like, for example. For an improvement of the localization, it is possible in the step of estimating the orientation and position of the object using a filter means, especially an EKF, to also use the rest phase of the corresponding sensor by means of a corresponding zero velocity update (ZUPT).

A further improvement of the method can be achieved by exclusively considering only undisturbed distances when determining the distances between the current position and the contour line. Undisturbed distances are understood as a linear connection between the starting position and the contour line that does not intersect an insurmountable obstacle, such as a wall. If other obstacles exist along this distance, i.e. in the path to be traveled by the object, this may result in a reduction of the probability If, for example, environmental data in the form of terrain data are used, a reduction of probability can be made by means of the calculation of the diffusion matrix, if the corresponding path to be traveled would lead through a forest, across a lawn or the like.

For a further improvement of the localization, in particular for an improvement of the speed of localization, the probability density functions for often occurring possible positions in an environment can be calculated in advance taking into account the environmental data and can be stored in a database. Thereby, the computational effort can be reduced significantly. In particular, this can be done for any possible position in a grid (e.g. 0.5 meters by 0.5 meters).

BRIEF DESCRIPTION OF THE DRAWINGS

The disclosure will be explained hereinafter with reference to an example and to the accompanying drawings.

In the Figures:

FIG. 1 is a schematic illustration of a diffusion matrix for a position inside a building, FIG. 2 is a schematic illustration showing the contour line in addition to the diffusion matrix illustrated in FIG. 1, and FIG. 3 illustrates a probability density function based on the distances between the position and the contour line for each orientation.

DETAILED DESCRIPTION OF THE PREFERRED EMBODIMENT

FIG. 1 shows a square detail of a building plan, the walls 10 in the building plan being illustrated as grey lines. The assumed current position 12 of an object, such as a person, is represented by the centre of the square shown in dark red. The highest value of the diffusion matrix is thus shown in dark red and decreases as the color changes to orange, yellow, green and blue. The diffusion matrix has been calculated by means of a diffusion filter. Preferably upon each recursion, the diffusion value at the assumed position (source of diffusion), i.e. at the centre of the square area in the example illustrated, is set to a predefined value, e.g. 1. At the walls 10, illustrated as grey lines in FIG. 1, the diffusion values are also set to a fixed value, in particular 0, during each step of the filtering, using a so-called layout matrix.

Based on a predetermined threshold value, a contour line 14 can then be determined. This is a closed line including those diffusion points whose value represents the highest value that is smaller or equal to the threshold value.

Such a contour line 14 can be seen in FIG. 2. It is defined by values of the corresponding diffusion matrix, on the one hand, and by walls 10, on the other hand.

Thereafter, distances between the assumed current position 12 and the contour line 14 are determined, taking into account only distances that are linear or undisturbed distances. Points inside the contour line 14 which, seen from the current position 12, lie behind a wall 10, will not be considered. These thoughts result in a probability density function 16 (FIG. 3). The values of the probability density function, preferably set to 1, only consider distances that are undisturbed or allow a direct line-of-sight connection between the current assumed position 12 and the contour line 14. It is obvious from the schematic illustration in FIG. 3 the possible directions of movement of the object have different probabilities. Based on the assumed starting point 12, a direction of movement in an orientation of about 40° is rather improbable, because there is a building wall.

For the sake of clarity, only a simple building structure is illustrated in the example. For example, no other obstacles, such as furniture, have been taken into account. It would also be possible, for example when the object moves in the open, to store additional probabilities. Different probabilities could be stored for areas, such as lawns and beds, which often are not used by an object for movement thereon. Further, it is also possible to take forests and the like into account. These are areas that a person will also move in with lower probability. Different probabilities considered are included in the calculation of the diffusion matrix through the layout matrix.

Further, information about the frequency with which ways are used can be integrated in the layout matrix. For example, heavily frequented ways can be accorded a higher probability through the layout matrix.

The probability density functions can also be used for a general prediction of orientations of moving persons or objects. Among others, this can be realized in movement models.

The invention claimed is:

1. A method for determining the position of a moving object having a sensor, comprising: transmitting odometry data from the sensor to a calculation device, estimating, via the calculation device, an orientation and position of the object, wherein the calculation device comprises a filter, creating a diffusion matrix based on the estimated orientation and position taking into account environmental data, determining a contour line based on the diffusion matrix, determining distances between the position and the contour line for different orientations, calculating a probability density function based on the distances, and determining a current orientation and position of the object via the filter based on a previously determined probability density function.

2. The method of claim 1, wherein the filter comprises a particle filter.

3. The method of claim 1, wherein the contour line is determined by a defined threshold value.

4. The method of claim 1, wherein the determination of the distances between the position and the contour line takes into account the environmental data to determine undisturbed distances.

5. The method of claim 1, further comprising correcting the position by determining further orientation and position data.

6. The method of claim 1, wherein the orientation and the position are corrected in rest phases of the object by setting a velocity of the filter to zero in rest phases.

7. The method of claim 1, wherein the filter uses an EKF filter.

8. The method of claim 1, wherein the filter is a cascaded filter system.

9. The method of claim 1, wherein the probability density function is calculated in advance taking into account the environmental data and is stored in a database.

10. The method of claim 1, wherein the environmental data include building and/or area plans.

11. The method of claim 1, wherein information about the frequency of use of ways is taken into account.

12. The method of claim 1, wherein the determined probability density functions are used in the general prediction of orientations of moving persons and objects.

13. A method for determining the position of a moving object having a sensor, comprising: transmitting odometry data from the sensor to a calculation device, estimating, via the calculation device, an orientation and position of the object, wherein the calculation device comprises a filter, creating a diffusion matrix based on the estimated orientation and position taking into account environmental data, determining a contour line based on the diffusion matrix, determining distances between the position and the contour line for different orientations, and calculating a probability density function based on the distances, wherein the orientation and the position are corrected in rest phases of the object by setting a velocity of the filter to zero in rest phases.

* * * * *